US009711963B2

(12) United States Patent
Molinari (10) Patent No.: US 9,711,963 B2
(45) Date of Patent: Jul. 18, 2017

(54) SUBSCRIBER LINE POWER DISTRIBUTION SYSTEM (75) Inventor: Mauro Molinari, Genoa (IT)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 1000 days.

(21) Appl. No.: 13/884,574

(22) PCT Filed: Nov. 9, 2010

(86) PCT No.: PCT/SE2010/051224
§ 371 (c)(1),
(2), (4) Date: May 9, 2013

(87) PCT Pub. No.: WO2012/064238
PCT Pub. Date: May 18, 2012

(65) Prior Publication Data
US 2013/0221747 A1 Aug. 29, 2013

(51) Int. Cl.
H02J 1/00 (2006.01)
H04M 19/00 (2006.01)

(52) U.S. Cl.
CPC ............. *H02J 1/00* (2013.01); *H04M 19/005* (2013.01); *Y10T 307/391* (2015.04)

(58) Field of Classification Search
CPC ...... H02J 1/10; H02J 3/00; H02J 3/14; H02M 1/10
USPC ........................................................ 307/29
See application file for complete search history.

(56) References Cited

U.S. PATENT DOCUMENTS

| 5,333,192 | A | 7/1994 | McGinn |
| 5,754,644 | A | 5/1998 | Akhteruzzaman |
| 6,351,531 | B1 | 2/2002 | Tahernezhaadi et al. |
| 6,351,534 | B1 | 2/2002 | Phillips |
| 6,542,605 | B1* | 4/2003 | Israelsson ........... H04M 19/005 379/399.01 |
| 2003/0095655 | A1 | 5/2003 | Nogushi et al. |
| 2004/0120512 | A1* | 6/2004 | Ploumen ............. H04M 19/005 379/413 |
| 2004/0151304 | A1* | 8/2004 | George ................. H04M 19/08 379/413 |

(Continued)

FOREIGN PATENT DOCUMENTS

EP 0 957 626 A2 11/1999
EP 0957626 A2 * 11/1999 .......... H04M 19/005
(Continued)

Primary Examiner — Rexford Barnie
Assistant Examiner — Joseph Inge (57) ABSTRACT A system and a method for distributing power to telecommunication subscriber lines is disclosed. It is important that the power dissipation in the subscriber line interface circuits, SLICs is reduced. Power dissipation occurs when the subscriber lines are fed with a voltage level that is higher than necessary. It is also important that the implementation allows for flexibility when configuring the subscriber lines. These problem have been solved by using a power distribution system comprising at least three power supply units with different power supply voltages, a control unit and a switching unit connected between the SLICs and the power supply units. The control unit is adapted to determine the loop voltages of the subscriber lines and to connect the corresponding SLIC to the power supply unit giving the least power dissipation.

9 Claims, 5 Drawing Sheets (56) References Cited

U.S. PATENT DOCUMENTS

2005/0212688 A1* 9/2005 Chung .................. G01D 4/004
                                                          340/870.02

FOREIGN PATENT DOCUMENTS

| EP | 1432224 A1 | 6/2004 | |
| SE | WO 9615617 A1 * | 5/1996 | .......... H04M 19/005 |
| WO | WO 96/15617 A1 | 5/1996 | |
| WO | WO 9963745 A1 | 12/1999 | |

* cited by examiner

SUBSCRIBER LINE POWER DISTRIBUTION SYSTEM

TECHNICAL FIELD

The present invention relates to a system and a method for distributing power to telecommunication subscriber lines.

BACKGROUND

The Plain Old Telephony Service (POTS) has since its origin been based on remote power feeding also called battery feed. The phone set at the subscriber premises is powered by using the current flowing in the subscriber loop provided by a DC power supply in the central office. Using remote power feeding the phone also works in case of mains outage, a feature sometimes called "life-line".

The power needed to feed a subscriber line depends on the loop length. Longer subscriber lines need a higher voltage level than shorter lines and can be up to 60 Volt DC. This level has been selected to be high enough to get through kilometers of subscriber lines but still low enough to be safe.

Excess power that is not transmitted along the subscriber line (due to impedance mismatch) is dissipated as heat at the subscriber line interface unit (line card) and is referred to as power dissipation.

Different solutions to provide power feeding to subscriber lines are known. One solution is to use a DC power supply (today often a DC/DC converter) for each subscriber line. By using one DC power supply per subscriber line, each subscriber line can be fed by a voltage level just above what it needs to operate and the power dissipation is minimized.

One disadvantage with this solution is that it is expensive. Another disadvantage is that the design becomes very complex for line cards comprising a large number of subscriber line interface circuits (SLIC). All DC/DC converters also consume a large area on the line card.

Yet another disadvantage is that when using a large number of DC/DC converters on the same line card, the converters add electromagnetic interference when they independently regulate the different subscriber lines.

Addressing some of these disadvantages, a number of other solutions have been proposed.

One solution is disclosed in U.S. Pat. No. 6,760,430. In this patent, a common voltage regulator feeds a number of subscriber line interface circuits (SLIC) or line drivers. The common voltage regulator has to provide a voltage level sufficiently high so that all subscriber lines including the longest subscriber line can operate. This means that for each subscriber line that is shorter than the longest one there is excess power that dissipates as heat from the line card.

Another solution is disclosed in U.S. Pat. No. 6,351,534. In this patent, subscriber lines are grouped according to their loop lengths. In one embodiment a group with the loop length 0 to 300 meters is connected to one line card and another group with the loop length 300 to 1000 meters is connected to another line card and so on. The line cards are mounted in a rack. Each group is fed by a power supply mounted on each line card with a sufficient voltage level sufficient to operate all subscriber lines in that group.

This solution reduces power dissipation compared to a solution where all subscriber lines (independent of loop lengths) are fed from the same voltage regulator as in U.S. Pat. No. 6,760,430.

One disadvantage with the solution in U.S. Pat. No. 6,351,534 is that it uses fixed range groups. This will result in a number of limitations when it comes to reconfiguring the rack comprising the line cards.

For example, when connecting a new 200 meters long subscriber line and if the line card configured for the range 0 to 300 m is full, it is necessary to add a new card for that range instead of using an unused subscriber line interface circuit on any of the other line cards. Another example, if one subscriber in the range 300 m to 1 km ends his/her subscription, the free subscriber line interface circuit is left unused until a new subscriber within the same range is identified.

It has been observed that the lengths in a set of subscriber lines connected to a central office seldom are evenly distributed. The normal case is that the line lengths are concentrated around certain ranges which in turn can vary depending on where the central office is located (such as rural or highly populated areas). Moreover, the ranges can also differ very much from country to country. Therefore, using a solution with fixed range groups there may also be a need to make additional market configurations and/or adaptations.

SUMMARY

The present invention is a power distribution system comprising at least two power supply units (such as DC/DC converters) that are feeding a set of subscriber line interface circuits (SLIC). Between the power supply units and the subscriber line interface circuits there is a switch unit that is adapted to connect (switch) current from the power supply units to the subscriber line interface circuits. The power distribution system also comprises a control unit. This control unit is adapted to set different power supply voltage levels for each power supply unit. The control unit is also adapted to determine the loop voltage of the subscriber lines when they are engaged and to control the switch unit so that each one of the subscriber line interface circuits is fed from a power supply unit having the lowest power supply voltage level but a level sufficiently high to operate the corresponding subscriber line.

The invention further includes a method to reduce power dissipation in the subscriber line interface circuits where the method comprises the step of setting different power supply voltage levels for the power supply units. At least one power supply unit is set to a power supply voltage level sufficiently high to operate any subscriber line. The method further comprises the step of determining the loop voltage of each corresponding subscriber line when engaged. When the loop voltage has been determined the method further comprises the step of connecting each line interface circuit to the power supply unit having the lowest power supply voltage level but a level sufficiently high to operate the corresponding subscriber line which in other words means the combination that is having the least power dissipation.

In one embodiment, the method further includes an algorithm to calculate the voltage level for each power supply unit so that the sum of the differences between the power supply voltage levels and voltage levels needed to operate each subscriber line is minimized.

The invention has the advantages of allowing for great flexibility and scalability when configuring a central office with POTS subscriber lines. It is not necessary to manually connect the subscriber line to a particular POTS line card (or group of line cards) that matches the loop length of the subscriber line. On the contrary, the subscriber line can be connected to any POTS line card with a free subscriber line interface circuit.

When adding new subscriber lines and if no more free subscriber line interface circuits are available, an additional POTS line card can simply be inserted and the new subscriber lines can be connected to this line card without considering the different loop lengths of each subscriber line.

When the subscriber line is connected, the power distribution system automatically determines the needed voltage level for the subscriber line and selects the power supply unit giving the lowest power dissipation.

Another advantage is that there is no need to define and configure a specific set of voltage levels according the country of deployment or the location of the central office as this is automatically set by the present invention.

Yet another advantage is that a single version of the power distribution system can be designed meeting all market requirements which makes it cheaper.

The objective with the present invention is therefore to provide a flexible power distribution system where the power dissipation in the line cards is reduced.

The invention will now be described in more detail and with preferred embodiments and referring to accompanying drawings.

DETAILED DESCRIPTION

Figure 1:
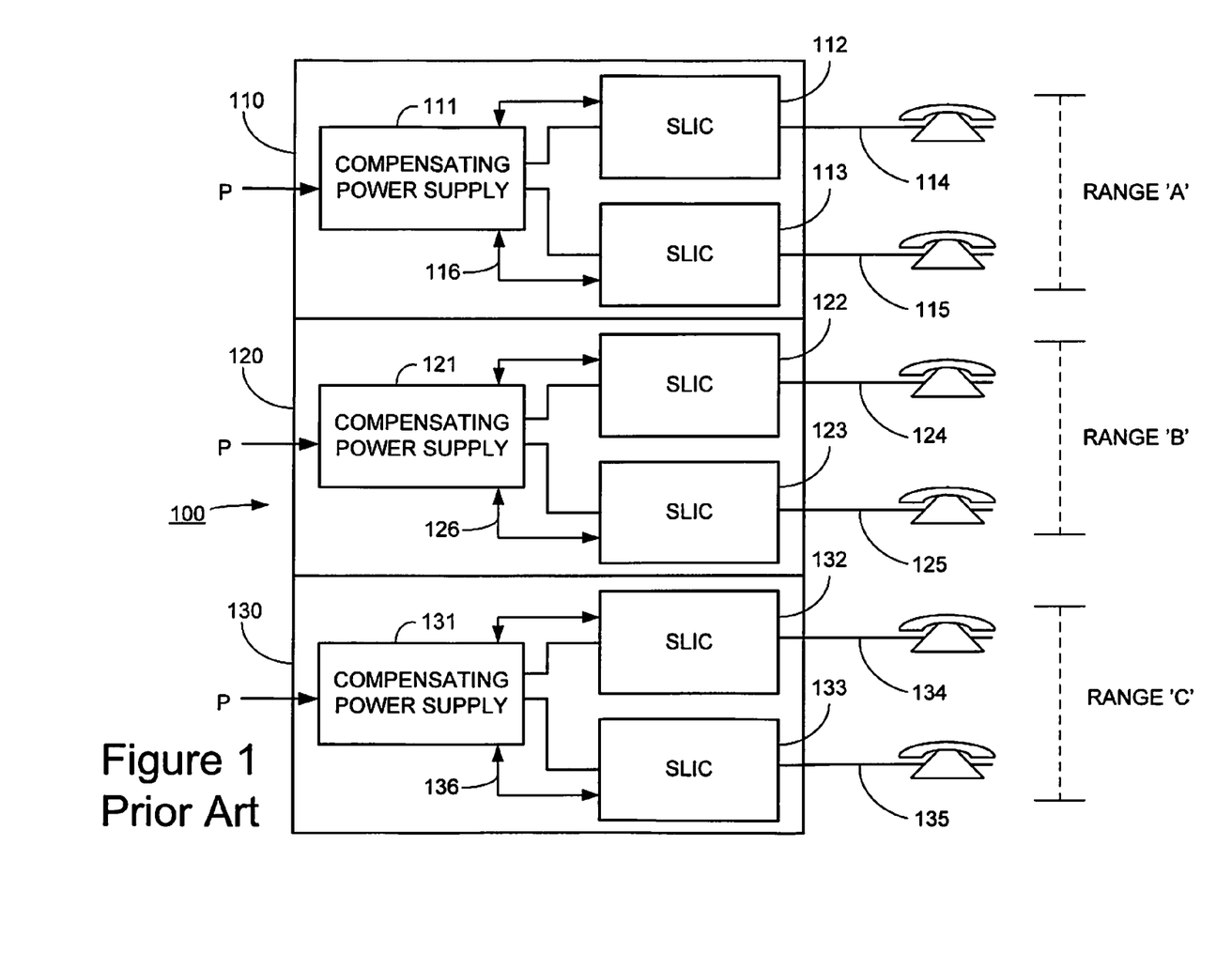
FIG. 1 is a block diagram illustrating remote power feeding according to prior art.

FIG. 1 illustrates a rack 100 with a power distribution system known from prior art (e.g. U.S. Pat. No. 6,351,534). In this system, subscriber lines are grouped together depending on its loop length. For example, subscriber lines 114,115 having a loop length within a range 'A' (for example 0-300 meters) are connected to a first line card 110. Subscriber lines 124,125 having a loop length within a range 'B' (for example 300-1000 meters) are connected to a second line card 120. Finally, subscriber lines 134,135 having a loop length within a range 'C' (for example >1000 meters) are connected to a third line card 130. Each line card 110,120, 130 has a compensating power supply 111,121,131.

Each power supply 111,121,131 monitors the loop voltage for the subscriber lines within each range A, B, C respectively and adapts each output voltage to a sufficient value where all subscriber lines within that range can operate. The power supply units 111,112,113 are themselves fed by a common power source P.

Figure 2:
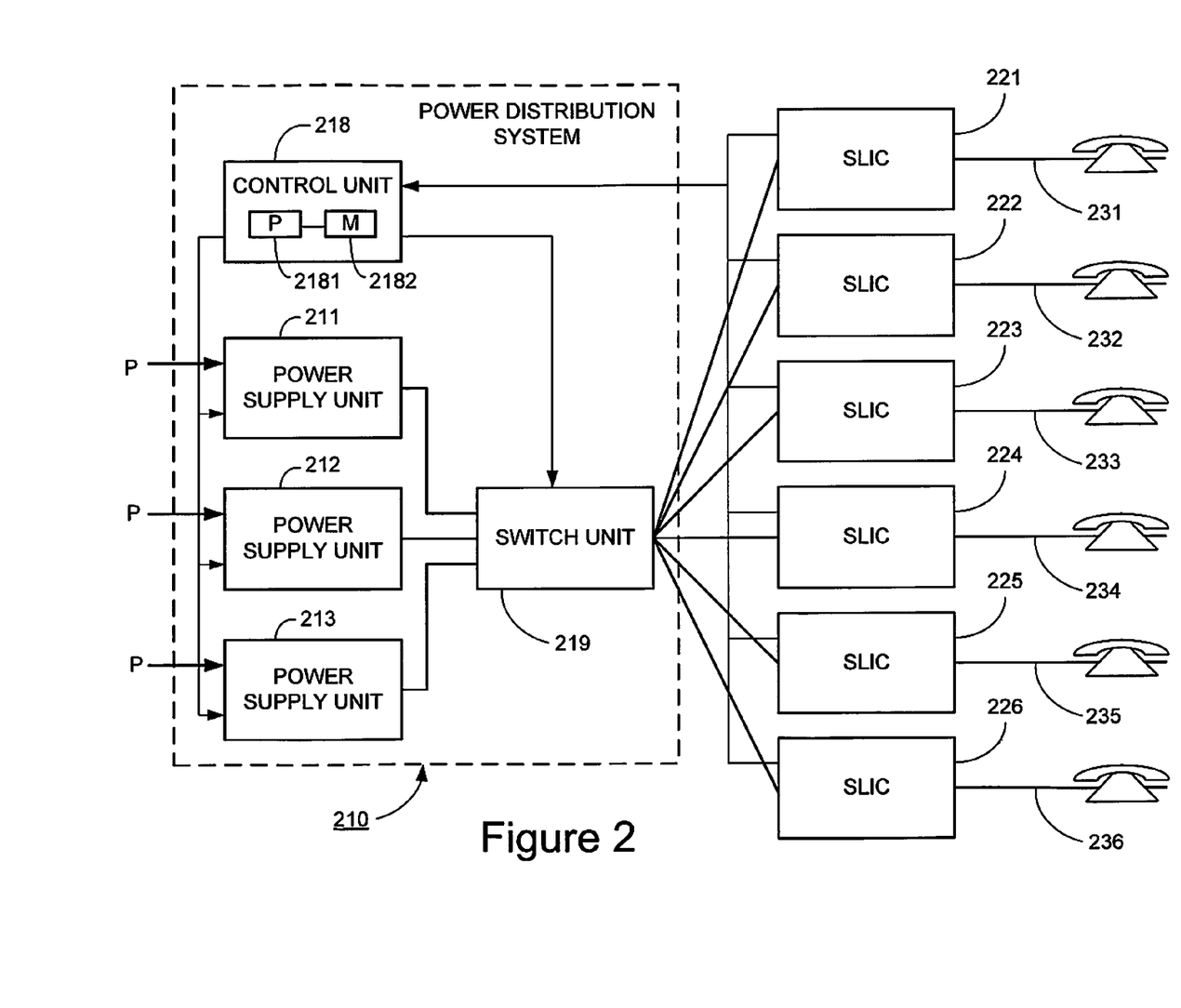
FIG. 2 is a block diagram illustrating remote power feeding according to an embodiment of the present invention.

FIG. 2 illustrates a preferred embodiment of a power distribution system 210 according to the present invention. The power distribution system 210 is adapted to serve a plurality of subscriber line interface circuits (SLIC) 221-226. To each subscriber line interface circuit 221-226 a subscriber line 231-236 can be connected.

Figure 3:
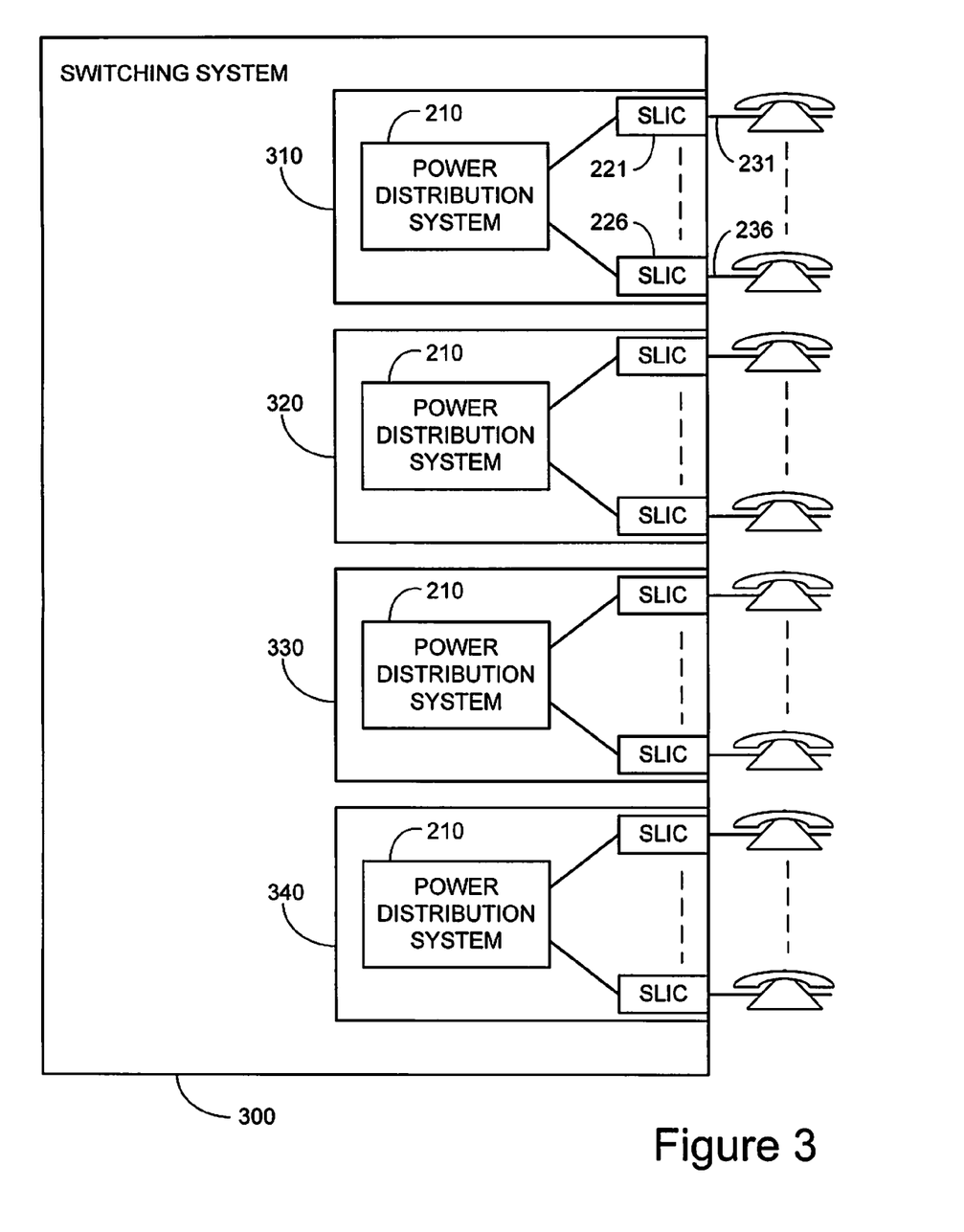
FIG. 3 is a block diagram illustrating a switching system with a number of line interface units each with a power distribution system.
Figure 4:
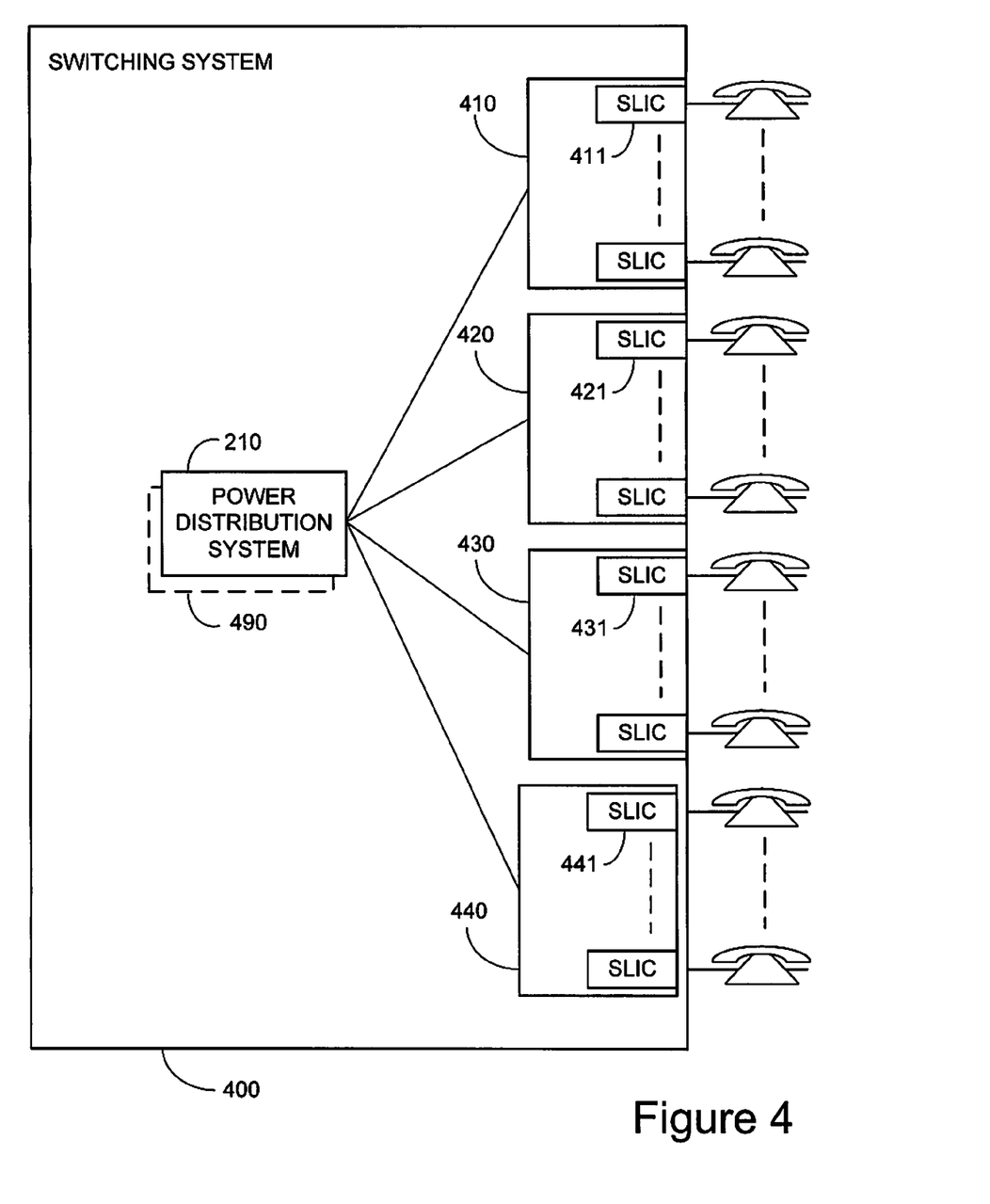
FIG. 4 is a block diagram illustrating a switching system with a number of line interface units fed by a common power distribution system.

The power distribution system 210 is mounted on a POTS line card 310,320,330,340 in a switching system 300 as illustrated by FIG. 3. In another embodiment it can be a common resource 210 in a switching system 400 serving a plurality of POTS line cards 410,420,430,440 as illustrated by FIG. 4.

The power distribution system 210 in FIG. 2 comprises three power supply units 211,212,213. The purpose of each power supply unit 211,212,213 is to provide different power supply voltage levels to the subscriber line interfaces 221-226 and the subscriber lines 231-236. The inventive concept is not limited to exactly three power supply units 211,212, 213. At least two power supply units can be used, but normally only a few compared to the number of subscriber lines. The embodiment with three power supply units 211, 212,213 is preferred because it provides a significant reduction of power dissipation but on the same time achieves the desired effect of reducing costs and complexity in the implementation. The power supply units 211,212,213 are themselves normally fed by a common power source P.

Each power supply unit 211,212,213 is connected to a common switch unit 219. This switch unit 219 is adapted to switch/connect current from the power supply units 211, 212,213 to the subscriber line interface circuits 221-226.

The power distribution system 210 further comprises a control unit 218 that is connected to all power supply units 211,212,213 and to the switch unit 219. In the preferred embodiment the control unit 218 is connectable to all subscriber line interface circuits 221-226 on the same line card 310 as the power distribution system 210.

The control unit 218 is adapted to monitor the subscriber line interface circuits 221-226 in order to determine the loop voltage for each connected subscriber line 231-236. The loop voltage is determined when the subscriber line is in the engaged mode (off-hook). The control unit 218 is further adapted to control the voltage levels in each power supply unit 211,212,213 and to control the switch unit 219 so that the current from a specific power supply unit 211,212,213 is fed to a specific group of subscriber line interface circuits. The control unit 218 is preferable implemented as a processor P 2181 with a memory area M 2182 comprising executable code to perform the functions described above and further below.

With the three power supply units 211,212,213 and the switch unit 219, the need to connect subscriber lines having loop lengths within a certain range to a specific line card is eliminated. Subscriber lines with an arbitrary loop length (within accepted telecom standards of course) can be connected to the same line card and fed by the power supply unit 211,212,213 giving the least power dissipation for that particular subscriber line.

When determining which subscriber line interface 221-226 is to be connected to which power supply unit 211,212, 213 giving the least power dissipation, the method comprises inter alia the step of determining the loop voltages for the subscriber lines 231-236. This is described more in detail further below.

As discussed above, the power distribution system 210 is preferably implemented on the same line card 310 as the served subscriber line interface circuits 221-226. FIG. 3 illustrates a switching system 300 with a plurality of line cards 310,320,330,340 each having a power distribution system 210 according the present invention. In another embodiment as illustrated by FIG. 4, the power distribution system 210 is a common resource in a switching system 400. In this case the power distribution system 210 is serving subscriber line interface circuits 411,421,431,441 on several line cards 410,420,430,440 respectively.

The switch system 400 could very well be equipped with a plurality of common power distribution systems 210, 490 for example for capacity reasons or for redundancy and back-up at failure.

When reducing the power dissipation in the subscriber line interfaces 221-226, it is important that each subscriber line interface 221-226 is connected to the power supply unit 211,212,213 having the lowest power supply voltage level but still having a level high enough so that the subscriber line 231-236 can operate. Optionally it is an advantage that also the sum of the power dissipations for all connected subscriber lines is minimized. In the preferred embodiment this means that the sum of the power dissipations for the subscriber lines 231-236 connected to the line card 310 is minimized.

The minimum voltage level Vmin needed for a subscriber line 231-236 to be operable is Vmin=Vab+Vas where Vab is the determined loop voltage and Vas is a predefined value for the anti saturation gap. Vas is the overhead voltage applied to front end amplifiers in the subscriber line interface circuits in order to allocate the requested dynamics for the voice signal in order to avoid signal clipping. The value of Vas is usually around 10V.

The value of the loop voltage level Vab for each subscriber line 231-236 is determined by the control unit 218 when the subscriber line is engaged.

Figure 5:
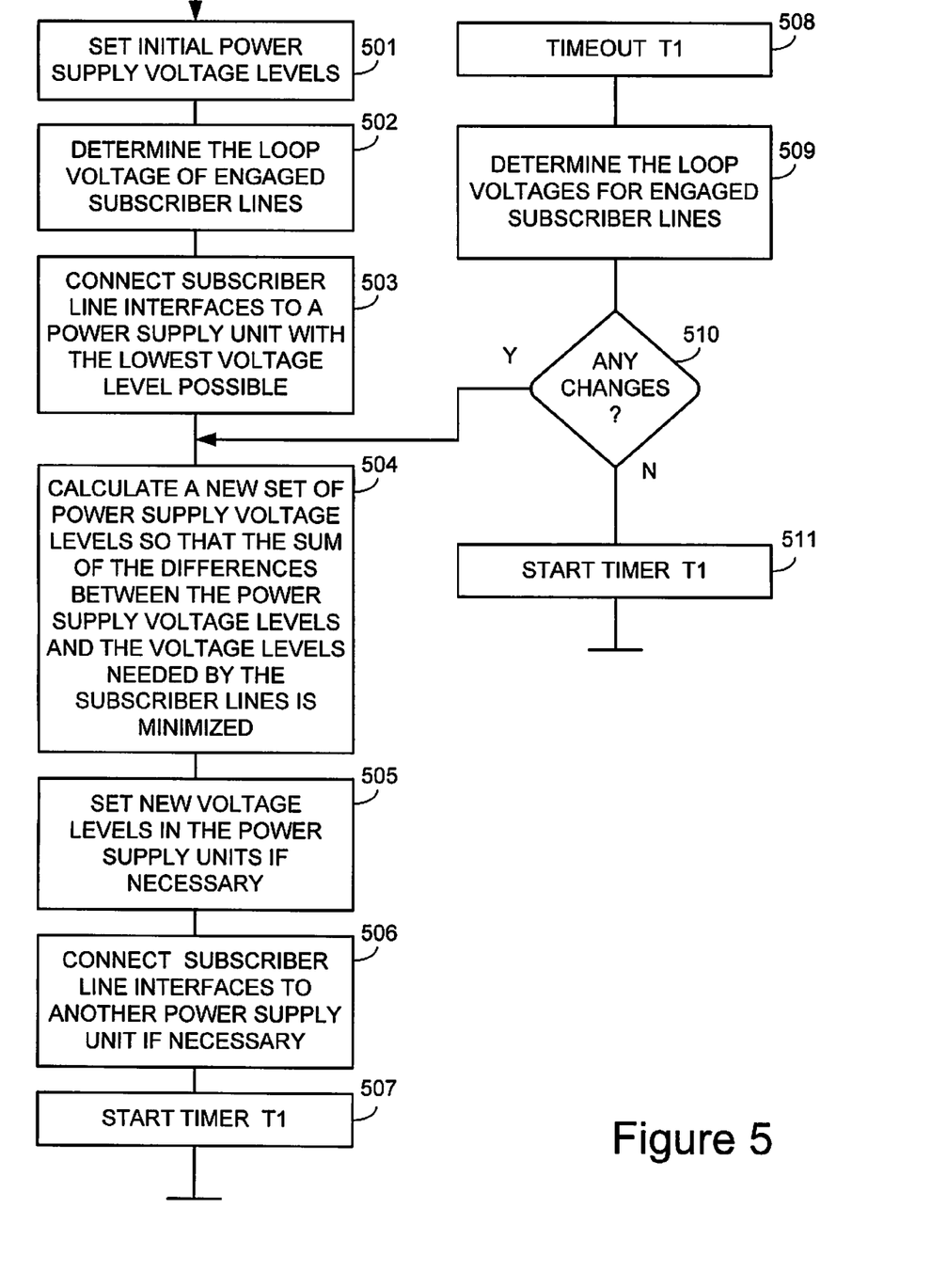
FIG. 5 is a flow chart illustrating a method for reducing power dissipation according to the present invention.

The principal method of reducing the power dissipation in the subscriber line interfaces 221-226 is illustrated by FIG. 5 and described below. It is assumed that the subscriber line interfaces 221-226 are initially connected to a power supply unit 211,212,213. In order to determine the loop voltage Vab of a subscriber line 231-236, the subscriber line 231-236 must be fed with a voltage level high enough so it can operate. To achieve this the power supply units 211,212,213 are in step 501 set with initial power supply voltage levels where at least one voltage level is set sufficiently high to operate any of the subscriber lines 231-236. The loop voltages Vab for the subscriber lines 231-236 when they are engaged (off-hook) are determined in step 502. When the loop voltage Vab has been determined, each subscriber line interface circuit 221-226 is connected to a power supply unit 211,212,213 having the lowest power supply voltage level but at least a level Vmin=Vab+Vas as described above. When the difference between the power supply voltage level and Vmin is small, the power dissipation is also small. It is assumed that the line current is the same for all subscriber lines 231-236 which means that finding the optimal voltage levels also results in finding the minimal power dissipation. The setting of the initial power supply voltage levels could optionally involve additional calculations as described in detail further below.

As a further option, the total power dissipation for a set of subscriber lines 231-236 can be further minimized in step 504 by minimizing the sum of the differences between the power supply voltage levels and Vmin for each corresponding subscriber lines 231-236. To minimize the sum of the differences means basically to find the optimum power supply voltage levels so that the sum of power dissipations for all connected subscriber lines 231-236 is minimized. Embodiments of an algorithm to calculate these power supply voltage levels are described in detail further below.

If the calculation results in new power supply voltage levels then they are set in step 505 for the power supply units 211,212,213. Also, if needed, some subscriber line interface circuits 221-226 may be connected in step 506 to another power supply unit 211,212,213. The calculation can optionally be repeated at regular intervals by starting a timer T1 in step 507. When the timer T1 times out in step 508, the loop voltages for the engaged subscriber lines are again determined in step 509. If changes are determined in step 510 a new calculation is made in step 504 and so on. If no changes are determined the timer T1 is started again in step 511.

An embodiment of the method is described below where the power distribution system 210 is mounted on a line card 310 with 64 line interface circuits and where the power distribution system 210 comprises three power supply units 211,212,213. The power supply voltage levels in the power supply units 211,212,213 are set to initial values at power up of the line card 310. One power supply voltage level Vh_init is set to a value sufficiently high so that any subscriber line 231-236 connected to the line card 310 can operate. These levels could be set by the power units 211,212,213 themselves or after a command from the control unit 218. Initially all subscriber line interface circuits 221-226 are connected to the power supply unit 211,212,213 with the highest voltage level.

In order to determine which power supply unit 211,212,213 is generating the least power dissipation for a particular subscriber line interface circuit 221-226 it is necessary to determining the loop voltage for each subscriber line 231-236 when engaged.

In this embodiment where the power distribution system 210 is connected to 64 subscriber lines, the algorithm could be exemplified by the following pseudo code:

```
maxVab = 0
for m = 1 to 64           (read Vab value for each connected
                           line up to 64)
Vab = measured loop voltage on line 'm'
if Vab > maxVab then      (take the max Vab value amongst
                           all the lines)
maxVab = Vab
end If
next m
```

When maxVab has been determined, the highest value Vh for the power supply units 211,212,213 is set to Vh=maxVab+Vas where Vas is the predefined value for the anti saturation gap.

A safe operational limit value minVh is normally preset in advance. If the determined value maxVab is less than minVh, then Vh is set to Vh=minVh+Vas. Otherwise Vh is set Vh=maxVab+Vas as above.

The remaining power supply voltage levels for the other power supply units are calculated to different initial values below Vh. In this embodiment the power distribution system 210 has three power supply units 211,212,213. This means that three voltage levels have to be calculated, the highest voltage level Vh (calculated as described above) and a medium voltage level Vm and a low voltage level Vl.

The value of the medium voltage level Vm can be set by an algorithm illustrated by the following pseudo code:

```
VM_max = Vh – deltaVhm    'upper acceptable limit for
                           VM according to selected Vh
                           value'
maxVab = 0
Ntot = 0                  'Ntot being the total number of
                           line connected to level Vm or Vl'
for m = 1 to 64           'read Vab value for
                           connected lines up to 64'
Vab = 'measured loop voltage on line 'm'
```

-continued

```
If Vab < (VM_max – Vas) then 'for each Vab value, which is
                                less than (VM_max – Vas)'
    Ntot = Ntot + 1             'add this line to the
                                total number of lines fed by
                                Vm or Vl'
        if Vab > maxVab then    'and search for the maximum
                                of those Vab values
                                which are less than (Vm_max –
                                Vas)'
            maxVab = Vab
        End If
    End If
Next m
Vm = maxVab + Vas               'set the initial estimated
                                value for Vm'
```

The parameter deltaVhm is a predefined value for the minimum difference between Vh and Vm.

In short, this algorithm sets value Vm to the maximum value maxVab in the set of Vab values less than (Vm max-Vas) plus the anti saturation gap Vas, that is Vm=maxVab Vas.

The value of the low voltage level Vl is set to a value between Vl max=Vm−deltaVml and the minimum acceptable voltage level Vl min=Vphone 4 Vas. The parameter deltaVml is a predefined value for the minimum difference between Vm and Vl. The constant value '4' represents the voltage drop due to the shortest subscriber loop length connecting the user phone to the subscriber line interface circuit 221-226. It is considered to be 4 V corresponding to 700 meters of smallest wire gauge at 20 mA. This means that a safe minimum value Vl is set. The parameter Vphone indicates the voltage drop present at that phone depending on its impedance and the loop current. Voltage drop value is usually in the range of 7 to 12 volt with loop current of 20 up to 40 mA.

The initial value of Vl could be set by using the following algorithm:

```
for n = 1 to 120
    p(n) = 0                    'P(n) is the array used to
                                estimated power dissipation
next n
Lmax = Int(Vl_max – Vas) * 2 ' let Lmax be the number in ½
                                volt steps up to Vl_max
S = 0
for n = 1 to Lmax ' assuming Vl being any values between
                                0,5V up to (Vl_max−Vas)
                                in steps of 0,5V
    S = S + 'number of lines requiring at most n·0,5V
                                ' S represents the total number of
                                lines fed by Vl, when it is supposed
                                to be equal to n·0,5V plus the anti
                                saturation gap Vas
    Plow = S * (n / 2 + Vas)
                                ' power consumption for all the lines
                                fed by Vl is accumulated here.
                                Actually the multiplication by loop
                                current is omitted considering it as
                                a common constant value.
    Pmid = (Ntot – S) * Vm
                                ' power consumption for all the lines
                                fed by Vm is accumulated here.
                                Since Ntot were previously evaluated
                                as the total number of lines fed
                                by Vm or Vl, (Ntot−S) are the lines
                                fed by Vm
                                Actually the multiplication by loop
                                current is omitted considering it as
                                a common constant value.
    p(n) = Plow + Pmid
                                ' total power consumption for all the
                                lines fed by both Vm and Vl
                                is accumulated here. Phigh, due to
                                lines fed by Vh, remains constant in
                                this phase.
    next n
' given the initial Vm value, the minimum in power
dissipation is found using the above estimated value for
both Vm and Vl.
' finding the minimum of power consumption versus Vl value
Pmin = p(1)
h = 1
for n = 2 to Lmax
    If p(n) < Pmin then
        Pmin = p(n)
        h = n
    end if
next n
Vl = h / 2 + Vas                ' set the initial estimated value
                                for Vl
' check if the initial estimated VBL value is acceptable
If Vl <V_min then
                                ' if the initial estimated value
                                for Vl is not acceptable
```

```
        minVab = Vl_max         ' starting from maximum acceptable
                                  Vl value
        for m = 1 to 64
                                ' read Vab value for each
                                  connected lines up to 64
            Vab = 'measured loop voltage on line 'm' '
            if Vab >= (Vl_min − Vas) then
                                ' for each Vab not less then the
                                  minimum stated for Vl
                if Vab < minVab then
                                ' save Vab as minimum if less then
                                  the other values checked so far
                    minVab = Vab
                end if
            end if
        next m
        Vl = minVab + Vas
                                ' set the initial estimated value
                                  for Vl
        h = Int(Vl − Vas) * 2
                                ' h represents Vl in steps of ½
                                  volt
    end if
```

The subscriber line interfaces 221-226 can now be connected to the power supply unit 211,212,213 having the lowest voltage level but sufficiently high to operate the corresponding subscriber line 231-236. Again, the subscriber line interface 221-226 is connected to the power supply unit 211,212,213 having the lowest power supply voltage level but having at least a voltage level Vmin=Vab+Vas.

The procedure above describes some procedures for setting the initial values of the power supply voltage levels to the power supply units 211,212,213 and connecting the subscriber line interfaces 221-226 to the power supply unit 211,212,213 generating the least power dissipation.

In order to minimize the sum of power dissipations for all the subscriber lines 231-236 connected to the line card 310, further trimming may be needed. This trimming can be initiated at regular intervals (for example each 15 minutes) in order to cope with changes in the configuration. The initial highest voltage level Vh, remains the same until it has been determined that the maximum loop voltage for all the subscriber lines has decreased. This could for example be the case when the subscriber line with the highest loop voltage has been uninstalled and/or removed from the line card 310. In this case the highest power supply voltage level Vh can be decreased, but never below the value Vh=minVh+Vas.

The optimal power supply voltage levels for the remaining power supply units are calculated based on the distribution of the determined loop voltage levels Vab for the subscriber lines. An algorithm to determine the optimal values is to try out combinations of all power supply voltage levels below Vh in steps (for example in steps of 0.5 Volt) until the sum of the power dissipations for all connected subscriber lines has reached a minimum. This algorithm can be used for any number of power supply units 211,212,213. When the power supply voltage levels have been calculated the power supply units 211,212,213 are set with the calculated values and the subscriber lines are connected to the power supply units 211,212,213 having the lowest power supply voltage level but sufficiently high to operate the corresponding subscriber line.

In the embodiment with three power supply units 211, 212,213 the algorithm is to try out each combination of power supply voltage levels Vm, Vl in steps. An example is shown below:

```
' optimizing the estimated VM value
Vm_min = Vl + deltaVml    ' lower acceptable limit for Vm
Nlow = 0                  ' number of lines fed by Vl
for n = 1 to h
    Nlow = Nlow +         ' number of lines requiring at most
                            n·0,5V'
next n                    ' Nlow represents the total number
                            of lines fed by Vl, assuming Vl
                            equal to h·0,5V plus the anti
                            saturation gap Vas
for n = 1 to 120          ' reset the P array
    p(n) = 0
next n
Lmin = h + 1              'minimum value for which a line is
                            switched to Vm
Lmax = Int(Vm − Vas) * 2
                          'maximum value for which a line is
                            switched to Vm
S = 0
for n = Lmin to Lmax
    S = S + 'number of lines requiring n·0,5V'
                          ' S represents the total number of
                            lines fed by Vm, assuming Vm equal
                            to n·0,5V plus the anti saturation
                            gap Vas
    Pmid = S * (n / 2 + Vas)
    Phigh = ((64 − Nlow) − S) * Vh
    p(n) = Pmid + Phigh
next n
'finding the minimum of power consumption versus Vm value
Pmin = p(Lmin)
k = Lmin
for n = Lmin + 1 to Lmax
    if p(n) < Pmin then
        Pmin = p (n)
        k = n
    end if
next n
Vm = k / 2 + Vas          'set the initial optimal estimated
                            value for Vm
'check if the optimal estimated Vm value is acceptable with
respect to Vh
if Vh − Vm > maxDeltaVhm then
                          'maximum voltage difference
                            between Vh and Vm
    maxVab = 0
    for m = 1 to 64
                          'read Vab value for each connected
                            lines up to 64
        Vab = 'measured loop voltage on line 'm' '
        if Vab < (Vh − maxDeltaVhm − Vas) then
            if Vab > maxVab then
```

-continued

```
          maxVab = Vab
        end If
      end If
    next m
    Vm = maxVab + Vas     'set the optimal estimated value
                           for Vm. It will correspond to the
                           closest Vab for which : Vh – Vm >
                           maxDeltaVhm is verified
end If
'check if the initial estimated Vl value is acceptable with
respect to Vm
If Vm – Vl > maxDeltaVml then
    maxVab = 0
    for m = 1 to 64
                           'read Vab value for each connected
                            lines up to 64
      Vab = 'measured loop voltage on line 'm ' '
      if Vab < (VM – maxDeltaVml – Vas) then
        if Vab > maxVab then
          maxVab = Vab
        end if
      end if
    next m
    Vl = maxVab + Vas
                          'set the optimal estimated value
                           for Vl It will correspond to the
                           closest Vab for which : Vm – Vl >
                           maxDeltaVMl is verified
end If
```

The invention claimed is:

1. A power distribution system, comprising:
at least three power supply units for feeding a plurality of subscriber line interface circuits, each adapted to be connected to a corresponding subscriber line;
a switch unit adapted to connect current from the power supply units to the subscriber line interface circuits; and,
a control unit adapted to:
  determine a loop voltage of the subscriber lines when engaged;
  set a different power supply voltage level for each of the at least three power supply units, wherein a highest power supply voltage level Vh is set to a value Vh=maxVab+Vas, wherein maxVab is a highest determined loop voltage and Vas is a predefined value for an anti saturation gap, and wherein the at least two power supply voltage levels below Vh are set by trying out combinations in predefined steps until a sum of the differences between the power supply voltage levels and the voltage levels needed to operate the corresponding subscriber lines is minimized; and,
  control the switch unit so that each one of the plurality of subscriber line interface circuits is fed from one of the at least three power supply units having a lowest power supply voltage level that is sufficiently high to operate the corresponding subscriber line.

2. The power distribution system according to claim 1, wherein the control unit is further adapted to: determine the loop voltages of the subscriber lines at regular intervals and, if necessary, perform at least one of the following:
  calculate new power supply voltage levels;
  set the new power supply voltage levels for the power supply units; and
  connect the line interface circuits to another power supply unit.

3. The power distribution system according to claim 1, wherein the power supply units comprise DC/DC converters.

4. The power distribution system according to claim 1, wherein the power distribution system is combined with the plurality of subscriber line interface circuits to form at least one subscriber line interface unit.

5. The power distribution system according to claim 4, wherein the at least one subscriber line interface unit forms a switching system.

6. The power distribution system according to claim 1, wherein the power distribution system feeds the plurality of subscriber line interface circuits on a plurality of subscriber line interface units, forming a switching system.

7. A method for reducing power dissipation in a plurality of subscriber line interface circuits, each connected to a corresponding subscriber line, wherein the subscriber line interface circuits are fed by a power distribution system comprising at least three power supply units, the method comprising:
  determining a loop voltage of each corresponding subscriber line when engaged;
  setting different power supply voltage levels for the at least three power supply units, wherein the highest power supply voltage level Vh is set to a value Vh=maxVab+Vas, wherein maxVab is a highest determined loop voltage and Vas is a predefined value for an anti saturation gap, and wherein the at least two power supply voltage levels below Vh are set by trying out combinations in predefined steps until the sum of the differences between the power supply voltage levels and the voltage levels needed to operate the corresponding subscriber lines is minimized; and,
  connecting each subscriber line interface circuit to one of the at least three power supply units having a lowest power supply voltage level that is sufficiently high to operate the corresponding subscriber line.

8. The method for reducing power dissipation according to claim 7, wherein the step of determining the loop voltages is performed at regular intervals and wherein any of the steps of calculating and setting the power supply voltages and connecting subscriber lines to another power supply unit are performed if necessary.

9. The method for reducing power dissipation according to claim 7, wherein the minimum voltage level Vmin necessary for operating a subscriber line is defined as Vmin=Vab+Vas, where Vab is the loop voltage of the subscriber line.

* * * * *